L. MARTOCCI-PISCULLI.
FORMALDEHYDE THERMOMETER HOLDER.
APPLICATION FILED JUNE 25, 1917.

1,253,857.  Patented Jan. 15, 1918.

WITNESSES
Frank C. Palmer.
C. Bradway.

INVENTOR
L. Martocci-Pisculli
BY
Munn Co.
ATTORNEYS

UNITED STATES PATENT OFFICE.

LEON MARTOCCI-PISCULLI, OF NEW YORK, N. Y.

FORMALDEHYDE THERMOMETER-HOLDER.

1,253,857.    Specification of Letters Patent.    Patented Jan. 15, 1918.

Application filed June 25, 1917. Serial No. 176,710.

*To all whom it may concern:*

Be it known that I, LEON MARTOCCI-PISCULLI, a subject of the King of Italy, and a resident of the city of New York, borough of Manhattan, in the county and State of New York, have invented a new and Improved Formaldehyde Thermometer-Holder, of which the following is a full, clear, and exact description.

This invention relates to thermometer holders of that type in which the thermometer by being inserted in the holder is freed from germs, so that there will be no danger of contagion when the thermometer is used on one patient after another, provided that the thermometer is inserted in the holder after use on each patient.

The invention has for its general objects to improve the construction and operation of devices of this character so as to be reliable and efficient in use, comparatively simple and inexpensive to manufacture, and so designed that liquid formaldehyde may be used as the germicidal agent without, however, having the thermometer at any time coated with the liquid formaldehyde.

A more specific object of the invention is the provision of a holder formed with a gas or vapor chamber into which vapor or gas can be admitted to envelop the thermometer by opening one or more ports between the chamber and an absorbent body outside the same which contains the liquid formaldehyde.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a side view with portions broken away to show the internal construction, and the valve ports being shown in register, so as to admit formaldehyde gas to the thermometer;

Figure 1:
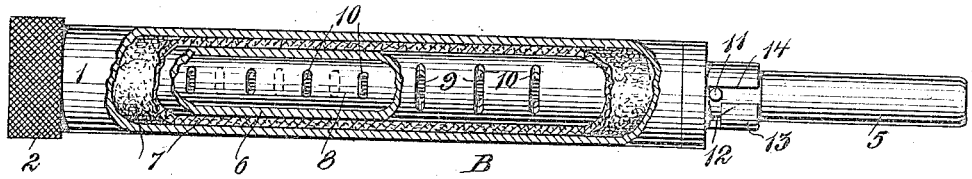
Figure 2:
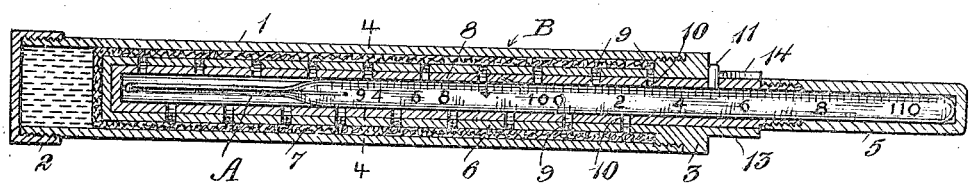
Fig. 2 is a longitudinal section of the thermometer holder with the valve ports in register.
Figure 3:
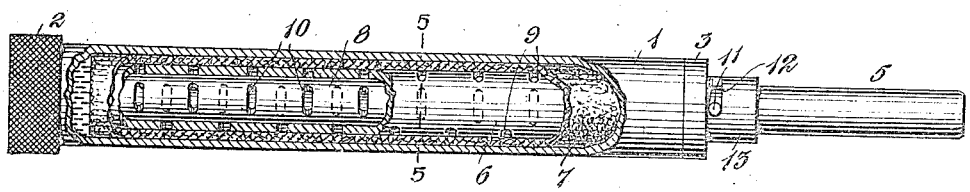
Fig. 3 is a view somewhat like Fig. 1, with the valve ports out of register and like Figs. 1 and 2 being drawn on an enlarged scale.
Figure 4:
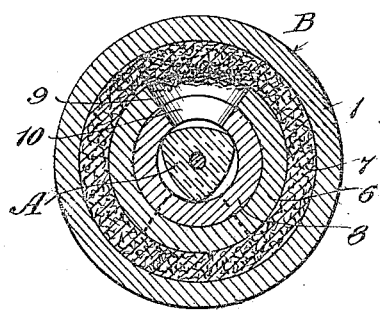
Fig. 4 is a transverse section on the line 4—4, Fig. 2.
Figure 5:
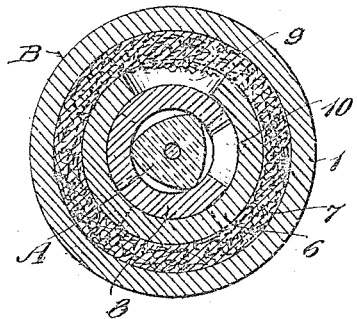
Fig. 5 is a transverse section on the line 5—5, Fig. 3.

Referring to the drawing, A designates the thermometer and B the holder therefor. The holder B comprises a tubular casing 1 having a screw cap or other closure 2 at one end and a plug or nipple 3 screwed into or otherwise fastened to the opposite end. This nipple has a reduced threaded portion on which screws the protecting cap 5 for the projecting end of the thermometer A. On the plug 3 is a tube 6 concentric with the tubular body 1 and of somewhat smaller diameter, so that in the space between the tubes may be a filling 7 of absorbent material, preferably a tube which is fitted on the tubular member 6. Snugly fitting in this tubular member 6 is an inner rotary tubular member 8 which is provided with a plurality of valve ports 10 adapted to be moved into and out of registry with the valve ports 9 in the tubular member 6. This tubular member 8 constitutes a chamber in which a thermometer A is placed, and when the ports are in registry, formaldehyde gas or vapor can pass from the outer chamber filled with the absorbent 7, such absorbent being saturated with formaldehyde which is poured into the holder when the cap 2 is removed. By turning the thermometer-holding chamber or tube 8 a partial turn, the ports 9 and 10 can be thrown out of registry, so that the gas will not escape. In the present instance there are two sets of ports 9 and 10 arranged at diametrically opposite points. To insure registry and nonregistry of the ports, a pin 11 is arranged on the tubular member 8, and the pin engages in a slot 12 in the extension 13 of the plug 3. The slot 12 may open axially, as indicated at 14, so as to permit the inner tube 8 to be withdrawn.

When the thermometer is to be used, the cap 5 is turned as far as the pin 11 and slot 12 will permit, whereby the ports 9 and 10 are thrown out of registry. A further turning of the cap 5 unscrews the same, so that it can be detached and the thermometer taken out of the holder. After the thermometer is used it is inserted in the holder and the cap is screwed on. The last part of the turning movement of the cap causes the tube 8 to turn so as to bring the slots 10 thereof into registry with the slots 9, whereby the gas will act on the thermometer to kill any germs thereon.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A germicidal thermometer comprising a body for containing a liquid, a pair of snugly fitting tubes within the body and each having ports spaced apart, the tubes being relatively movable to move the ports into and out of register, and a body of absorbent material filling the space between the body and the tubes, whereby vapors of the germicide can pass from the absorbent material to the inner tube through the ports when registering.

2. A thermometer holder comprising a tubular body, a fixed tubular member in the body and having valve ports, an absorbent between the tubular member and wall of the body for holding a liquid germicide, and an inner tubular member movable in the first-mentioned tubular member and having valve ports adapted to move into and out of register with the first-mentioned valve ports.

3. A thermometer holder comprising a tubular body, a fixed tubular member in the body and having valve ports, an absorbent between the tubular member and wall of the body for holding a liquid germicide, an inner tubular member movable in the first-mentioned tubular member and having valve ports adapted to move into and out of register with the first-mentioned valve ports, and means for limiting the relative movement of the tubular members.

4. A thermometer holder comprising a body open at one end to receive a germicide, a closure for the said open end, a fixed tube in the body having valve ports, an absorbent material surrounding the said fixed tube for holding liquid germicide, a second tube having a snug sliding fit in the first-mentioned tube and provided with ports adapted to be moved into and out of register with the first-mentioned ports, means on the body having a bayonet slot, a pin on the inner tube engaging the slot for limiting the relative movement of the tubes and permitting the inner tube to be removed, and a cap applied to the inner tube to protect the projecting end of the thermometer when placed in the inner tube.

LEON MARTOCCI-PISCULLI.

Copies of this patent may be obtained for five cents each, by addressing the "Commissioner of Patents, Washington, D. C."